April 5, 1966     W. E. MACKEY     3,244,125
AUTO DATE TRAY
Filed Sept. 9, 1963
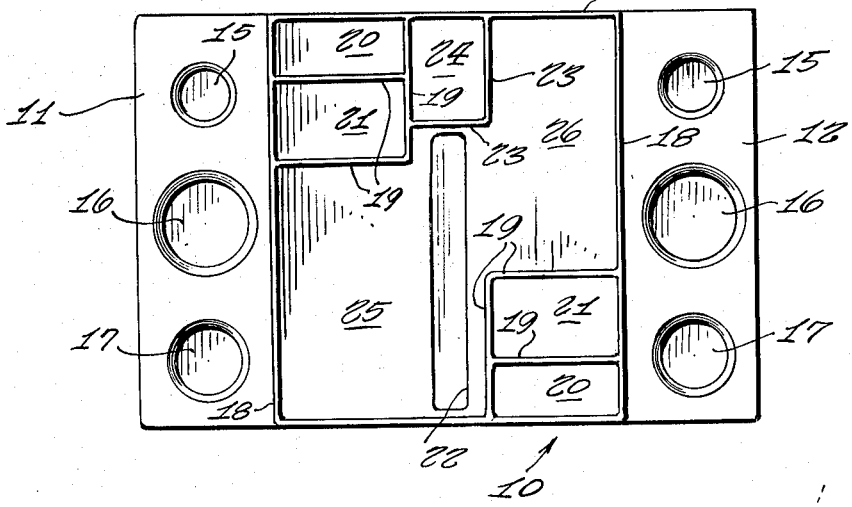
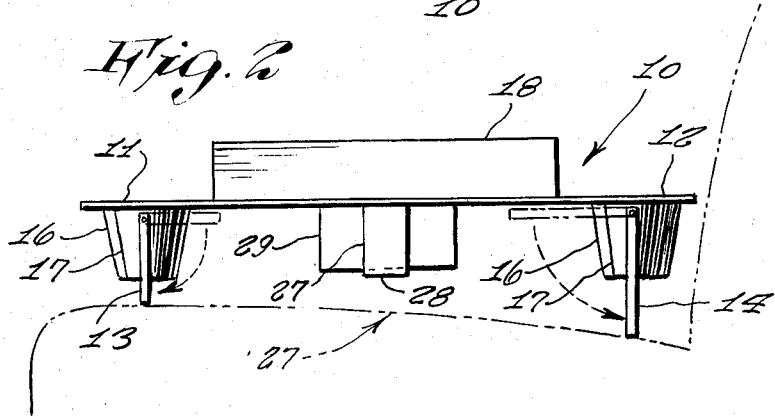
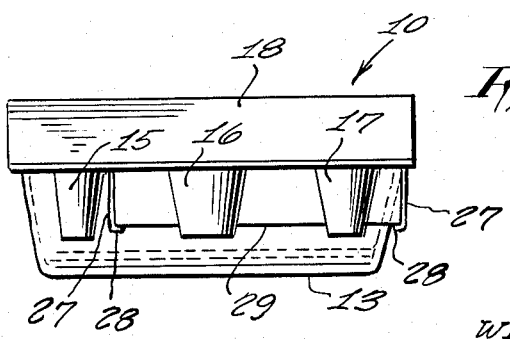
INVENTOR.
WILLIAM E. MACKEY
BY
Carl Miller
ATTORNEY 3,244,125
AUTO DATE TRAY
William E. Mackey, 2309 W. Lawrence, Springfield, Ill.
Filed Sept. 9, 1963, Ser. No. 307,581
2 Claims. (Cl. 108—25)

This invention relates to serving trays and more particularly to trays for use in automobiles.

The normal tray used at drive-ins for attaching the tray on the door of an automobile. Thus, the only occupant who has a tray for use while eating is the person adjacent the door on which the tray is supported. Although this one person primarily benefits from the accessibility of the tray, there is the inconvenience of having to pass food, condiments and drinks to the person on the other side of the car. Trays of this type are shown, described and claimed in U.S. Patent 2,014,745 that was granted to R. R. Regli on September 17, 1935.

Accordingly, an object of this invention is to provide a tray for use in an automatic which is accessible to both occupants of a seat.

Another object of this invention is to provide the foregoing tray which rests on the automobile seat when in use and provides a surface which is horizontal and level.

Still another object of this invention is to provide the foregoing tray which is compartmented for separately holding individual items.

And another object of this invention is to provide the foregoing tray which provides similar compartments for each of the users.

The foregoing and other objects and advantages of the invention will be more clearly understood by referring to the following description and the accompanying drawings, wherein:

FIGURE 1 is a plan view of a tray made in accordance with the present invention.

FIGURE 2 is a front elevational view of the novel tray of FIGURE 1.

FIGURE 3 is an end elevational view of the novel tray of FIGURE 1.

Referring now to the drawings, a tray 10 made in accordance with the present invention is primarily a flat member having sheet-like ends 11 and 12, each of the ends having three depending frusto-conical depressions 15, 16 and 17. The depressions 15, 16 and 17 are adapted to hold different sized cups or tumblers and provides such supported cups or tumblers for each of the two occupants of an automobile seat.

Between the ends 11 and 12 is an annular upwardly extending rectangular flange 18 defining a food area. Two smaller upwardly extending flange networks 19 are disposed in diagonally opposed corners of flange 18, each defining a pair of compartments 20 and 21. Tray 10 has an elongated opening 22 midway between the ends 11 and 12 for receiving napkins or tissues therethrough. Opening 22 commences at one side of the tray 10 adjacent flange 18 and terminates short of the other side. An upwardly extending L-shaped flange 23 is disposed adjacent the end of recess 22 and forms with parts of flange 18 and one of the flanges 19, a compartment 24 for condiments such as salt, pepper and sugar. Compartment 24 may have a magnetic bottom surface to prevent tipping of holders of such condiments.

Compartment 24 and opening 22 divide the area enclosed within the flange 18, with the exception of the two pairs of compartments 20 and 21, into two main food compartments 25 and 26; one for each occupant of an automobile seat.

Thus, except for holding means 22 and 24, each of two occupants of an automobile seat using a tray 10 has individual holders 15, 16 and 17, for cups or tumblers and individual food compartments 20, 21 and 25 or 26.

To provide accessibility to both occupants, a pair of U-shaped legs 13 and 14 are provided pivotally connected at the ends 11 and 12, respectively, of tray 10. Leg 14 is longer than leg 13, as shown in FIGURE 2 so the tray may be placed on the cushion 27 of the automobile seat and provide a level horizontal platform.

On the underside of tray 10 there are a pair of downwardly extending tab elements 27, each of which is provided with a sideward extending bead 28 adjacent the lower edge thereof. These elements comprise catch devices between which a conventional box of disposable tissue 29 may be inserted and receivably held, with the open end of the box being adjacent the underside of the tray 10. Thus, the tissue may be dispensed from the box 29 through the opening 22 of the tray 10.

It is to be understood that a container integrally formed on the underside of the tray may be substituted for the catch devices, and a box of tissue may be readily inserted into the container with the open side of the box adjacent the opening 22, if so preferred.

While certain novel features of my invention have been shown and described and are pointed out in the annexed claims, it will be understood that various omissions, substitutions and changes in the forms and details of the device illustrated and in its operation can be made by those skilled in the art without departing from the spirit of the invention.

Having thus described my invention, I claim as new and desire to secure by Letters Patent:

1. A tray for use in automobiles comprising a flat sheet-like portion, a plurality of frustoconical depending recesses in each end of the sheetlike portion corresponding in sizes and number to the recesses in the other end, an annular upwardly extending rectangular flange disposed between the recesses defining a food holding area, a pair of U-shaped legs each pivotally connected to one end of the tray, one leg being longer than the other for holding the tray in a horizontal position on an automobile seat, a pair of upwardly extending flange networks disposed in diametrically opposed corners of the annular flange to provide two pairs of food holding compartments, an upwardly extending L-shaped flange cooperating with one of the flange networks forming a compartment and with the rectangular recess dividing the tray area with the annular flange into two main food compartments, wherein said compartment formed by the L-shaped flange has a magnetic bottom for holding articles placed therein from tipping, and having an elongated opening in said tray and a pair of depending catch devices on the underside of said tray adjacent each longitudinal end of said elongated opening, each of said catch devices comprising a tab having a sideward extending bead to form a catch for retaining a conventional box of disposable tissue therebetween.

2. A tray in accordance with claim 1, having an elongated opening in said tray and a container on the underside of said tray beneath said opening, said container having access means for receiving therein a box of conventional disposable tissue.

(References on following page)

References Cited by the Examiner

UNITED STATES PATENTS

| | | | |
|---|---|---|---|
| 1,916,202 | 7/1933 | Bubien | 108—25 |
| 2,346,582 | 11/1944 | Insler | 211—1.24 X |
| 2,460,712 | 2/1949 | Peterson | 108—131 X |
| 2,512,963 | 6/1950 | Peiker | 229—28 |
| 2,619,154 | 11/1952 | Erickson | 108—146 X |
| 2,689,156 | 9/1954 | Kolander | 108—45 |
| 2,723,037 | 11/1955 | Matesic | 108—6 |
| 2,825,611 | 3/1958 | Aynesworth | 108—45 |
| 2,837,388 | 6/1958 | Majeroni et al. | 108—25 |
| 2,986,438 | 5/1961 | Smathers et al. | 108—132 X |

FRANK B. SHERRY, *Primary Examiner.*